United States Patent
Duffy et al.

(10) Patent No.: US 6,606,974 B1
(45) Date of Patent: Aug. 19, 2003

(54) PARTITIONING OF A GOVERNOR FUEL OUTPUT INTO THREE SEPARATE FUEL QUANTITIES IN A STABLE MANNER

(75) Inventors: Kevin P. Duffy, East Peoria, IL (US); Brian G. McGee, Chillicothe, IL (US)

(73) Assignee: Caterpillar Inc, Peoria, IL (US)

( * ) Notice: Subject to any disclaimer, the term of this patent is extended or adjusted under 35 U.S.C. 154(b) by 358 days.

(21) Appl. No.: 09/615,607

(22) Filed: Jul. 13, 2000

(51) Int. Cl.$^7$ .................................................. F02B 3/00
(52) U.S. Cl. ....................................................... 123/299
(58) Field of Search ................................ 123/299, 294, 123/300, 445

(56) References Cited

U.S. PATENT DOCUMENTS

| | | |
|---|---|---|
| 4,571,683 A | 2/1986 | Kobayashi et al. |
| 4,576,135 A | 3/1986 | Johnson |
| 4,621,599 A | 11/1986 | Igashira et al. |
| 4,704,999 A | 11/1987 | Hashikawa et al. |
| 4,729,056 A | 3/1988 | Edwards et al. |
| 4,836,161 A | 6/1989 | Abthoff et al. |
| 4,922,878 A | 5/1990 | Shinogle et al. |
| 5,020,979 A | 6/1991 | Askew |
| 5,070,836 A | 12/1991 | Wahl et al. |
| 5,113,833 A | 5/1992 | Nagano et al. |
| 5,245,972 A | 9/1993 | Denz et al. |
| 5,267,545 A | 12/1993 | Kitson |
| 5,268,842 A | 12/1993 | Martson et al. |
| 5,277,164 A | 1/1994 | Takahashi et al. |
| 5,320,079 A | 6/1994 | Kuwabara |
| 5,379,733 A | 1/1995 | Haddick et al. |
| 5,427,072 A | 6/1995 | Udo |
| 5,427,083 A | 6/1995 | Ahern |
| 5,450,829 A | 9/1995 | Beck |
| 5,460,128 A | 10/1995 | Kruse |
| 5,492,098 A | 2/1996 | Hafner et al. |
| 5,499,608 A | 3/1996 | Meister et al. |
| 5,507,260 A | 4/1996 | Hintzen |
| 5,540,205 A | 7/1996 | Davis et al. |
| 5,549,092 A | 8/1996 | Hasegawa et al. |
| 5,566,650 A | 10/1996 | Kruse |
| 5,566,660 A | 10/1996 | Camplin et al. |
| 5,588,415 A | 12/1996 | Ahern |

(List continued on next page.)

FOREIGN PATENT DOCUMENTS

EP 0 221 832 A2 5/1987

OTHER PUBLICATIONS

SAE Feb. 24–27, 1997 A New Concept for Low Emission Diesel Combusion—Printed from Diesel Engine Combustion Processes and Emission Control Technologies (SP–1246).

Primary Examiner—Bibhu Mohanty
(74) Attorney, Agent, or Firm—Blackwell Sanders

(57) ABSTRACT

A fuel injection control system and method for delivering multiple fuel injections to a cylinder of an engine during a fuel injection event based upon engine operating conditions, the control system including an electronic controller coupled to an electronically controlled fuel injection device, and a plurality of sensors coupled to the controller for inputting certain signals representative of certain engine operating conditions of the engine, the controller being operable to output a fuel injection signal to the fuel injection device to deliver pilot, main, and anchor fuel shots to the cylinder during a fuel injection event based upon the sensor signals. The controller also divides the desired fuel quantity between the three shots. In dividing the total fuel set by the governor system between the three shots, the controller determines desired pilot and anchor fuel shot amounts and also determines minimum pilot, main, and anchor fuel shot amounts. By comparing the total fuel with various sums of the desired and minimum fuel amounts, actual fuel amounts for each shot are determined with the main shot given first priority, the pilot shot given second priority, and the anchor shot given third priority.

20 Claims, 8 Drawing Sheets

U.S. PATENT DOCUMENTS

| | | | |
|---|---|---|---|
| 5,609,131 | A | 3/1997 | Gray, Jr. et al. |
| 5,634,448 | A | 6/1997 | Shinogle et al. |
| 5,647,317 | A | 7/1997 | Weisman, II et al. |
| 5,678,521 | A | 10/1997 | Thompson et al. |
| 5,685,273 | A | 11/1997 | Johnson et al. |
| 5,701,870 | A | 12/1997 | Gottshall et al. |
| 5,704,336 | A | 1/1998 | Wrobel |
| 5,722,373 | A | 3/1998 | Paul et al. |
| 5,732,680 | A | 3/1998 | Ninomiya et al. |
| 5,740,775 | A | 4/1998 | Suzuki et al. |
| 5,740,776 | A | 4/1998 | Enderle et al. |
| 5,746,183 | A | 5/1998 | Parke et al. |
| 5,778,850 | A | 7/1998 | Buratti et al. |
| 5,794,585 | A | 8/1998 | Yonezawa et al. |
| 5,803,049 | A | 9/1998 | Harcombe |
| 5,832,901 | A | 11/1998 | Yoshida et al. |
| 5,839,275 | A | 11/1998 | Hirota et al. |
| 5,865,153 | A | 2/1999 | Matsumoto |
| 5,865,158 | A | 2/1999 | Cleveland et al. |
| 5,893,347 | A | 4/1999 | McGee et al. |
| 5,979,398 | A | 11/1999 | Yanagihara |
| 5,979,412 | A | 11/1999 | Werner |
| 5,986,871 | A | 11/1999 | Forck et al. |
| 6,000,384 | A | 12/1999 | Brown et al. |
| 6,006,727 | A | 12/1999 | Katashiba et al. |
| 6,009,849 | A | 1/2000 | Yamanoto et al. |
| 6,014,956 | A | 1/2000 | Cowden et al. |
| 6,021,370 | A | 2/2000 | Bellinger et al. |
| 6,026,780 | A | 2/2000 | Barnes et al. |
| 6,032,642 | A | 3/2000 | Trumbower et al. |
| 6,044,824 | A | 4/2000 | Mamiya et al. |
| 6,415,762 | B1 * | 7/2002 | Hafner et al. ............... 123/300 |
| 6,467,452 | B1 * | 10/2002 | Duffy et al. ............... 123/299 |

* cited by examiner

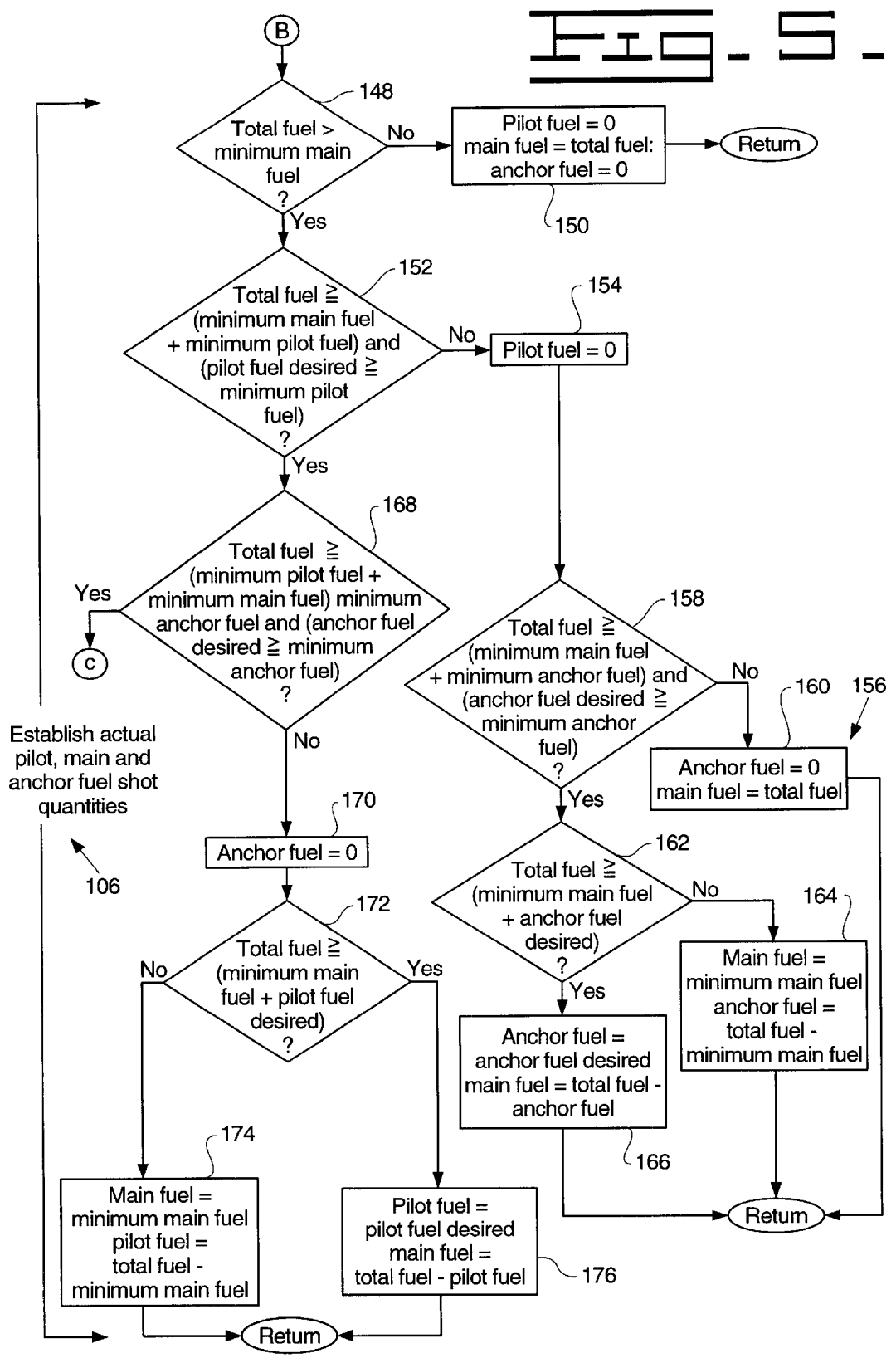

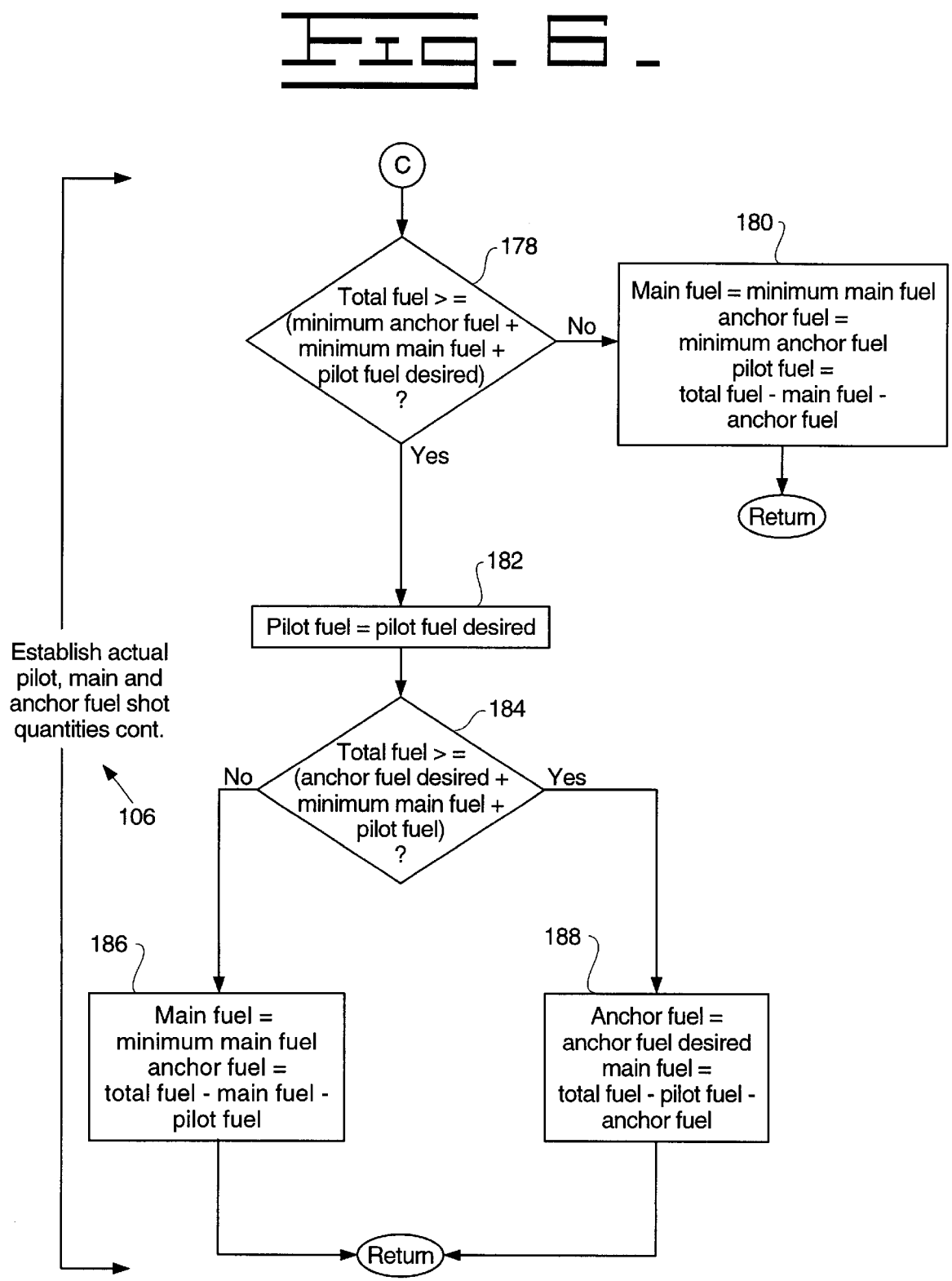

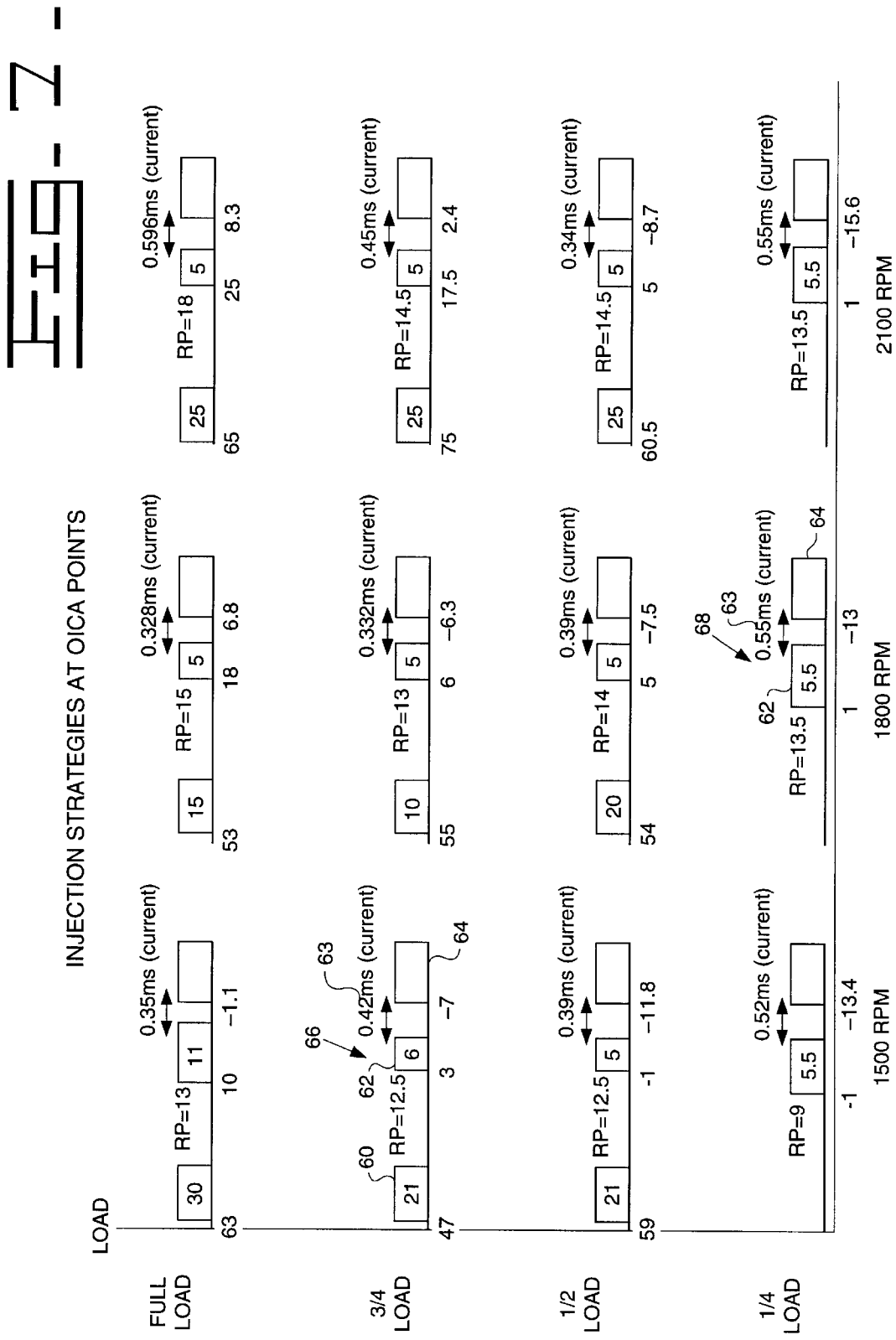

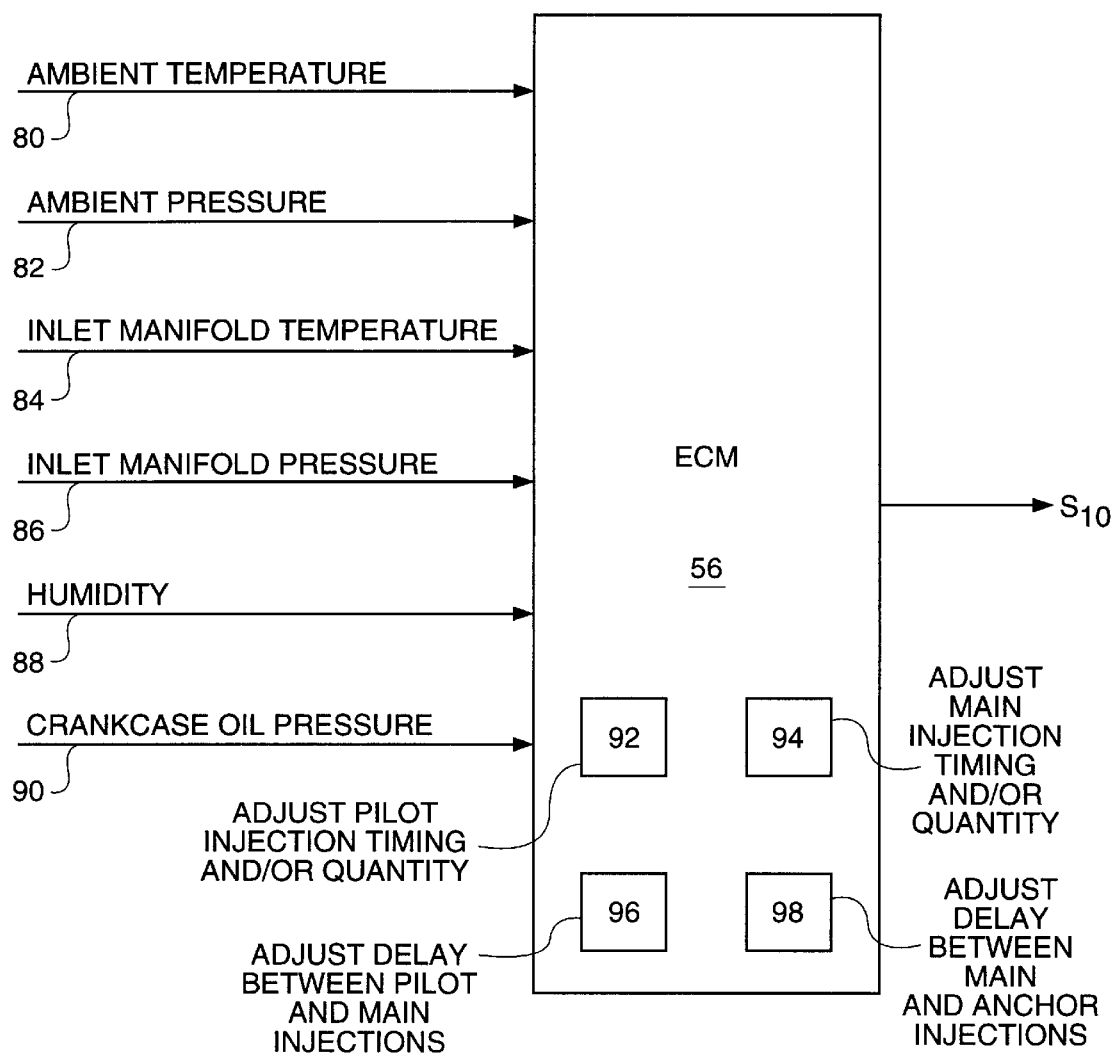

PARTITIONING OF A GOVERNOR FUEL OUTPUT INTO THREE SEPARATE FUEL QUANTITIES IN A STABLE MANNER

TECHNICAL FIELD

This invention relates generally to electronically controlled fuel injection systems and, more particularly, to a method and apparatus for delivering and controlling the fuel quantity of multiple fuel injections to the cylinder of an internal combustion engine during a fuel injection event based upon engine operating conditions.

BACKGROUND ART

Electronically controlled fuel injectors are well known in the art including both hydraulically actuated electronically controlled fuel injectors as well as mechanically actuated electronically controlled fuel injectors. Electronically controlled fuel injectors typically inject fuel into a specific engine cylinder as a function of an injection signal received from an electronic controller. These signals include waveforms that are indicative of a desired injection rate as well as the desired timing and quantity of fuel to be injected into the cylinders.

Emission regulations pertaining to engine exhaust emissions are increasingly becoming more restrictive throughout the world including, for example, restrictions on the emission of hydrocarbons, carbon monoxide, the release of particulate, and the release of nitrogen oxides ($NO_x$). Tailoring the number of injections and the injection rate of fuel to a combustion chamber, as well as the desired quantity and timing of such fuel injections, is one way in which to control emissions and meet such emission standards. As a result, split fuel injection techniques have been utilized to modify the burn characteristics of the combustion process in an attempt to reduce emission and noise levels. Split injection typically involves splitting the total fuel delivery to the cylinder during a particular injection event into two separate fuel injections, for example, a pilot injection shot and a main injection shot. At different engine operating conditions, it may be necessary to use different injection strategies in order to achieve both desired engine operation and emissions control. For example, one split injection technique may be utilized at engine operating conditions including low engine speed and low engine load while other techniques may be utilized at different engine operating conditions. In the past, the controllability of split injection has been somewhat restricted by mechanical and other limitations associated with the particular types of injectors utilized. Even with more advanced electronically controlled injectors, during certain engine operating conditions, it is sometimes difficult to accurately control fuel delivery, even when utilizing current control signals.

As used throughout this disclosure, an injection event is defined as the injections that occur in a cylinder during one cycle of the engine. For example, one cycle of a four cycle engine for a particular cylinder, includes an intake, compression, expansion, and exhaust stroke. Therefore, the injection event in a four stroke engine includes the number of injections, or shots, that occur in a cylinder during the four strokes of the piston. The term shot as used in the art may also refer to the actual fuel injection or to the command current signal to a fuel injector or other fuel actuation device indicative of an injection or delivery of fuel to the engine.

Desired engine performance is not always achieved using split fuel injections at all engine speeds and engine load conditions. Based upon operating conditions, the injection timing, injection pressure, and quantity of fuel are desirably optimized in order to achieve desired emissions and desired fuel consumption. This is not always achieved in a split injection system due to a variety of reasons, including limitations on the different types of achievable injection waveform types, the amount of fuel injected during the separate fuel injections, when the injections take place during the particular injection event, the timing sequence between the injections, and how closely spaced injections influence each other. As a result, problems such as injecting fuel too rapidly within a given injection event and/or allowing fuel to be injected beyond a desired stopping point can adversely affect emission outputs and fuel economy.

In a system in which multiple injections and different injection waveforms are achievable, it is desirable to control and deliver any number of separate fuel injections to a particular cylinder so as to minimize emissions and fuel consumption based upon the operating conditions of the engine at that particular point in time, e.g. changes in speed, load, or ambient conditions. This may include splitting the fuel injection into more than two separate fuel shots during a particular injection event, providing larger fuel quantities in the pilot shot, advancing the pilot shot during the injection event, and adjusting the timing between the various multiple fuel injection shots in order to achieve desired emissions and desired fuel consumption. In some situations, it is also desirable to rate shape the front end of the fuel delivery to the cylinder to control the burn characteristics of the particular fuel being utilized. Further, in some situations the shot duration or the fuel quantity may be so small that it is not practical to inject the shot.

Accordingly, the present invention is directed to overcoming one or more of the problems as set forth above.

DISCLOSURE OF THE INVENTION

In one aspect of the present invention, there is disclosed an electronically controlled fuel injection system which is capable of delivering multiple separate fuel injections to a particular cylinder of an internal combustion engine during a single injection event. The system includes at least one fuel injection device operable to deliver a plurality of fuel injection shots and a controller which is operable to determine the number of fuel shots, and the actual fuel amounts to be used in each shot.

In a preferred embodiment, the controller is operable to determine desired and minimum pilot shot fuel amounts, a minimum main shot fuel amount, and minimum and desired anchor shot fuel amounts. The total fuel quantity determined by the governor system is compared with various sums of these desired and minimum fuel amounts to determine the actual pilot, main, and anchor shot fuel amounts for injection by at least one fuel injection device. In proportioning the fuel among the multiple shots, the controller, in one embodiment, gives first priority to the main shot and second priority to the pilot shot. Thus, in one embodiment, if there is only enough fuel for the main shot, the pilot shot and anchor shot are set to substantially zero, and if there is only enough fuel for the main and pilot shots, the anchor shot is set to zero. If, however, there is not enough total fuel for the pilot and main shot, but there is enough fuel for the main and anchor shots, then the pilot shot will be set to substantially zero and the total fuel will be divided between the main shot and the anchor shot in accordance with the present invention.

In another aspect of the present invention, a computer readable medium contains instructions for controlling the fuel injection control system to partition the governor fuel output, the actual pilot, main, and anchor shot fuel amounts. The instructions determine if there is enough fuel output for the minimum main shot fuel amount, if there is enough governor fuel output for the desired pilot shot fuel amount, and if there is enough governor fuel output for the desired anchor shot fuel amount. Based on these various determinations, the instructions determine the actual pilot, main, and anchor shot fuel amounts.

In a preferred embodiment, a minimum pilot shot fuel amount and a minimum anchor shot fuel amount are also determined. To give the pilot shot priority over the anchor shot, the instructions determine if there is enough fuel for the pilot shot prior to determining if there is enough fuel for the anchor shot.

In another aspect of the present invention, a method is described for controlling a fuel injection control system to partition the governor fuel output. The method comprises determining the desired pilot and anchor shot fuel amounts and the minimum main shot fuel amount. The method then determines whether there is enough fuel for the minimum main shot fuel amount, the desired pilot shot fuel amount, and the desired anchor shot fuel amount. Based upon those determinations, the method then determines the actual pilot, main, and anchor shot fuel amounts.

In a preferred embodiment, the actual pilot shot fuel amount is injected prior to the actual main shot fuel amount, and the actual anchor shot fuel amount is injected after the actual main shot fuel amount. To determine the actual fuel amounts to be injected, the governor fuel output or total fuel quantity to be delivered is compared with various sums of the desired and minimum pilot shot fuel amounts, the minimum main shot fuel amount, and the minimum and desired anchor shot fuel amounts.

BRIEF DESCRIPTION OF THE DRAWINGS

For a better understanding of the present invention, reference may be made to the accompanying drawings in which:

FIG. 5 is a schematic block diagram illustrating determination of actual pilot, main, and anchor shot fuel amounts;

FIG. 6 is a schematic block diagram illustrating determination of the actual pilot, main, and anchor shot fuel amounts if there is enough governor fuel output for at least minimum pilot, main, and anchor fuel shot amounts;

FIG. 7 is a chart illustrating an example of the injection strategies for steady state emissions taken at certain engine operating conditions based upon engine speed and engine load; and FIG. 8 is an exemplary schematic illustration of one embodiment of a control system for adjusting the parameters of a fuel injection event based upon ambient conditions.

BEST MODE FOR CARRYING OUT THE INVENTION

Figure 1:
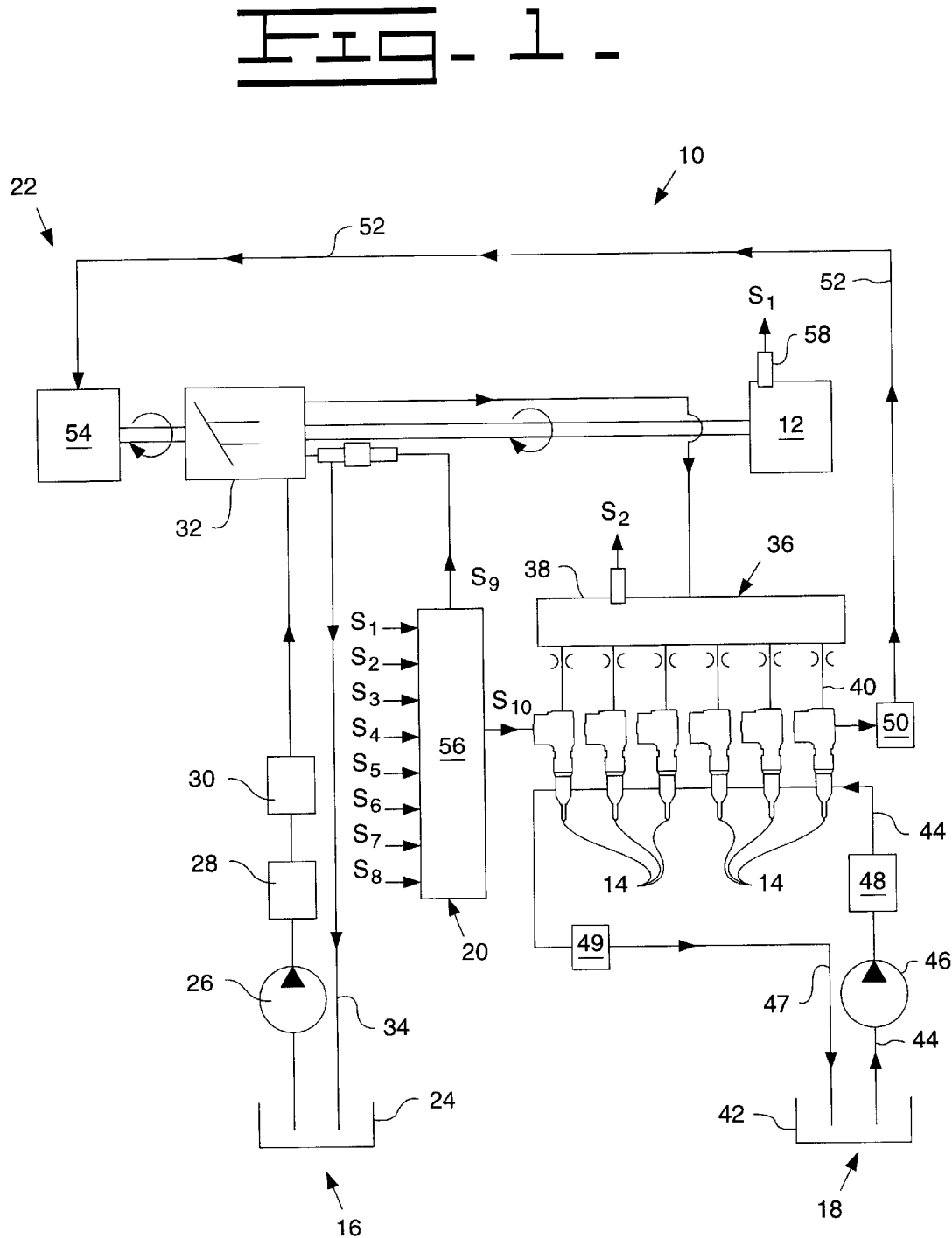
FIG. 1 is a schematic view of an electronically controlled injector fuel system used in connection with one embodiment of the present invention.

Referring to FIG. 1, there is shown one embodiment of a hydraulically actuated electronically controlled fuel injection system 10 in an exemplary configuration as adapted for a direct-injection compression ignition engine 12. Fuel system 10 includes one or more electronically controlled fuel injection devices, such as a fuel injector 14, which are adapted to be positioned in a respective cylinder head bore of the engine 12. While the embodiment of FIG. 1 applies to an in-line six cylinder engine, it is recognized and anticipated, and it is to be understood, that the present invention is also equally applicable to other types of engines such as V-type engines and rotary engines, and that the engine may contain any plurality of cylinders or combustion chambers. In addition, while the embodiment of FIG. 1 also illustrates a hydraulically actuated electronically controlled fuel injector system, it is likewise recognized and anticipated that the present invention is also equally applicable to other types of fuel injection devices including, electronically controlled injectors, mechanically actuated electronically controlled injector units as well as fluid activated common rail type fuel injection systems with digitally controlled fuel valves.

The fuel system 10 of FIG. 1 includes an apparatus or means 16 for supplying actuation fluid to each injector 14, an apparatus or means 18 for supplying fuel to each injector, electronic control means 20 for controlling the fuel injection system including the manner and frequency in which fuel is injected by the injectors 14 including timing, number of injections per injection event, fuel quantity per injection, time delay between each injection, and the injection profile. Thus, each injector 14 is operable to deliver a plurality of fuel injections during each injection event. The system may also include apparatus or means 22 for recirculating fluid and/or recovering hydraulic energy from the actuation fluid leaving each injector 14.

The actuating fluid supply means 16 preferably includes an actuating fluid sump or reservoir 24, a relatively low pressure actuating fluid transfer pump 26, an actuating fluid cooler 28, one or more actuation fluid filters 30, a high pressure pump 32 for generating relatively high pressure in the actuation fluid, and at least one relatively high pressure actuation fluid manifold or rail 36. A common rail passage 38 is arranged in fluid communication with the outlet from the relatively high pressure actuation fluid pump 32. A rail branch passage 40 connects the actuation fluid inlet of each injector 14 to the high pressure common rail passage 38. In the case of a mechanically actuated electronically controlled injector, manifold 36, common rail passage 38 and branch passages 40 would typically be replaced with some type of cam actuating arrangement or other mechanical means for actuating such injectors. Examples of a mechanically actuated electronically controlled fuel injector unit are disclosed in U.S. Pat. Nos. 5,947,380 and 5,407,131. In a preferred embodiment, the injection device is a fuel injector, but it may be a digitally controlled fuel valve associated with a common rail fuel system.

Apparatus 22 may include a waste accumulating fluid control valve 50 for each injector, a common recirculation line 52, and a hydraulic motor 54 connected between the actuating fluid pump 32 and recirculation line 52. Actuation fluid leaving an actuation fluid drain of each injector 14 would enter the recirculation line 52 that carries such fluid to the hydraulic energy recirculating or recovering means 22. A portion of the recirculated actuation fluid is channeled to high pressure actuation fluid pump 32 and another portion is returned to actuation fluid sump 24 via recirculation line 34.

In a preferred embodiment, the actuation fluid is engine-lubricating oil and the actuating fluid sump 24 is an engine lubrication oil sump. This allows the fuel injection system to be connected as a parasitic subsystem to the engine's lubricating oil circulation system. Alternatively, the actuating fluid could be fuel.

The fuel supply means 18 preferably includes a fuel tank 42, a fuel supply passage 44 arranged in fluid communication between the fuel tank 42 and the fuel inlet of each injector 14, a relatively low pressure fuel transfer pump 46, one or more fuel filters 48, a fuel supply regulating valve 49, and a fuel circulation and return passage 47 arranged in fluid communication between each injector 14 and fuel tank 42.

Electronic control means 20 preferably includes an electronic control module (ECM) 56, also referred to as a controller, the general use of which is well known in the art. ECM 56 typically includes processing means such as a microcontroller or microprocessor, a governor such as a proportional integral derivative (PID) controller for regulating engine speed, and circuitry including input/output circuitry, power supply circuitry, signal conditioning circuitry, solenoid driver circuitry, analog circuits and/or programmed logic arrays as well as associated memory. The memory is connected to the microcontroller or microprocessor and stores instruction sets, maps, lookup tables, variables, and more. ECM 56 may be used to control many aspects of fuel injection, including (1) the fuel injection timing, (2) the total fuel injection quantity during an injection event, (3) the fuel injection pressure, (4) the number of separate injections or fuel shots during each injection event, (5) the time intervals between the separate injections or fuel shots, (6) the time duration of each injection or fuel shot, (7) the fuel quantity associated with each injection or fuel shot, (8) the actuation fluid pressure, (9) current level of the injector waveform, and (10) any combination of the above parameters. Each of such parameters are variably controllable independent of engine speed and load. ECM 56 receives a plurality of sensor input signals $S_1$–$S_8$ which correspond to known sensor inputs such as engine operating conditions including engine speed, engine temperature, pressure of the actuation fluid, cylinder piston position and so forth that are used to determine the precise combination of injection parameters for a subsequent injection event.

For example, an engine temperature sensor 58 is illustrated in FIG. 1 connected to engine 12. In one embodiment, the engine temperature sensor includes an engine oil temperature sensor. However, an engine coolant temperature sensor can also be used to detect the engine temperature. The engine temperature sensor 58 produces a signal designated by $S_1$ in FIG. 1 and is inputted to ECM 56 over line $S_1$. In the particular example illustrated in FIG. 1, ECM 56 issues control signal $S_9$ to control the actuation fluid pressure from pump 32 and a fuel injection signal $S_{10}$ to energize a solenoid or other electrical actuating device within each fuel injector thereby controlling fuel control valves within each injector 14 and causing fuel to be injected into each corresponding engine cylinder. Each of the injection parameters are variably controllable, independent of engine speed and load. In the case of the fuel injectors 14, control signal $S_{10}$ is a fuel injection signal that is an ECM commanded current to the injector solenoid or other electrical actuator.

Figure 2:
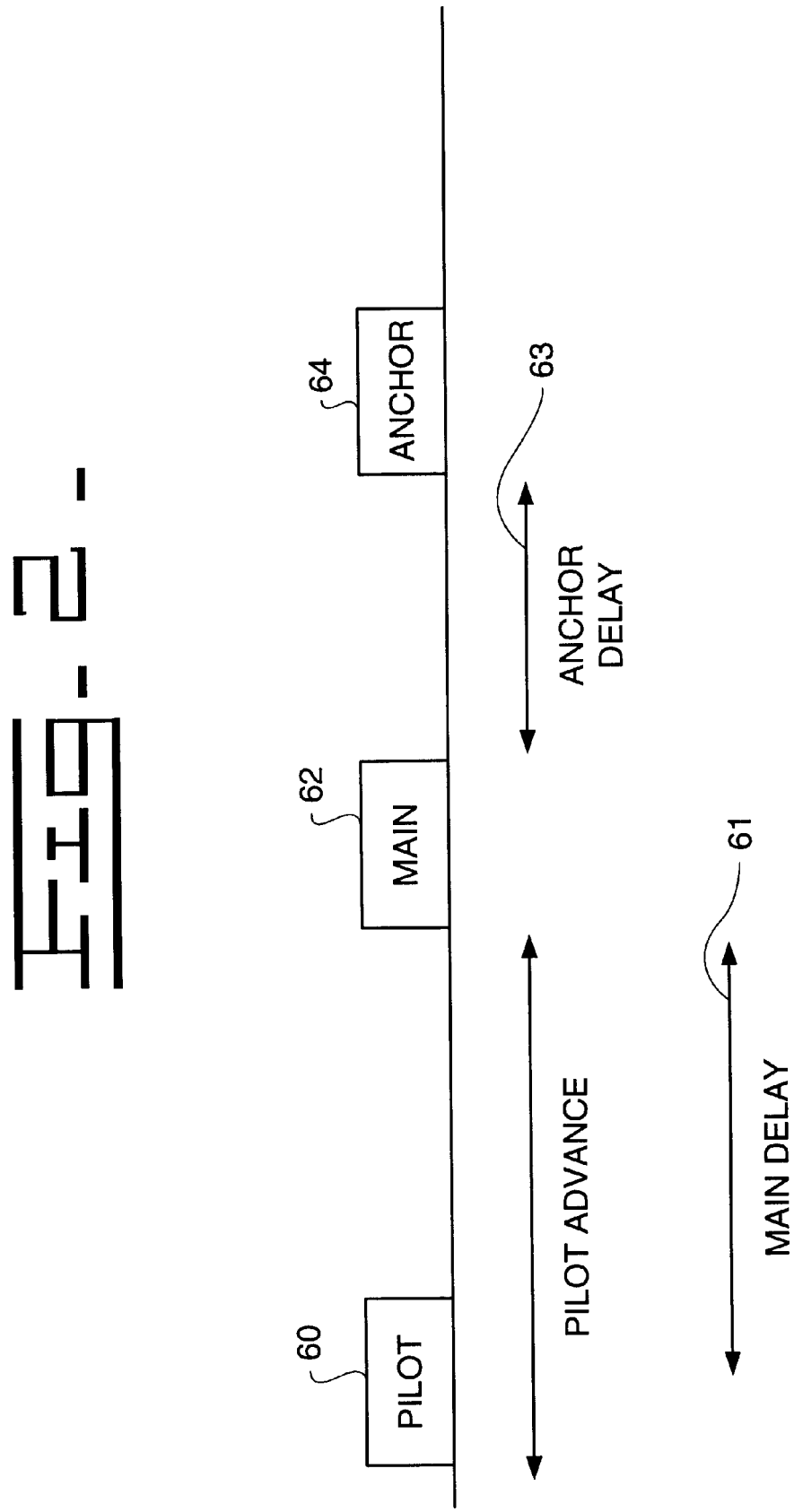
FIG. 2 is a schematic profile of a three shot fuel injection event.

It is recognized that the type of fuel injection desired during any particular fuel injection event will typically vary depending upon various engine operating conditions. In an effort to minimize emissions, it has been found that delivering multiple separate fuel injections to a particular cylinder during a fuel injection event at varying engine operating conditions achieves both desired engine operation as well as emissions control. FIG. 2 illustrates a multiple injection event including three separate fuel injections, namely, a first fuel injection or pilot shot 60, a second fuel injection or main shot 62, and a third fuel injection or anchor shot 64. As illustrated in FIG. 2, the pilot shot 60 is injected into the combustion chamber in advance of the main shot 62 by some predetermined time factor, crank angle or main delay 61, and the anchor shot is sequenced after the main shot 62 based upon a predetermined time factor, crank angle or anchor delay 63. Based upon programming associated with electronic controller 56 as well as a variety of different maps and/or lookup tables stored within the memory of controller 56 including maps and/or tables relating to engine speed, engine load, the pressure associated with rail passage 38 (rail pressure), desired total fuel quantity and other parameters, controller 56 will be able to dynamically determine the appropriate number of fuel shots, the quantity of fuel required for each fuel shot and partition the fuel among the shots. In addition, the controller 56 will be able to determine the timing and duration of each individual shot as well as the anchor delay 63. In the three shot multiple injection depicted in FIG. 2, a portion of the total fuel to be delivered to the combustion chamber will be injected as the pilot shot 60, a portion of such total fuel will be injected as the main shot 62, and a remaining portion of the total fuel to be injected will be injected as the anchor shot 64. Under certain operating conditions, a three shot multiple fuel injection has advantages in terms of exhaust emissions, including reduced particulate emissions and/or reduced $NO_x$ emissions as well as desired engine performance.

The output of the governor system may be referred to as the total desired fuel quantity, that the governor request be injected, or as the total available fuel quantity. That is, for the purposes of fuel distribution among the shots, the governor system establishes the total available fuel quantity that is desired to be allocated during the injection. Once a total available fuel quantity is determined, the present invention may be utilized to determine how to partition the fuel quantity among a desired number of shots. FIGS. 3 through 6 illustrate one embodiment of the partitioning of the desired total fuel quantity into the desired pilot shot 60, desired main shot 62, and desired anchor shot 64. This partitioning is accomplished by establishing minimum fuel amounts based on engine speed and load for the three shots as illustrated by the group of steps generally designated 100, and establishing the desired pilot and anchor fuel amounts to be commanded as illustrated by the groups of steps generally designated 102, 104, respectively. The minimums are established because injecting fuel quantities less than the minimum can cause or exacerbate instability. For example, there may be limitations in the accuracy of fuel delivery of the fuel system such that, when attempting to inject less than an established minimum, the fuel system is not able to accurately inject the requested amount. Therefore, an inaccurate amount of fuel may be injected causing undesired engine operation. In addition, the minimum values may be established such that less than the minimum value, even though the amount may be accurately injected, leads to undesired engine operation or emissions.

FIG. 7 illustrates one embodiment of a fuel injection strategy. That is, for a given speed and a given load, the map illustrated in FIG. 7 may be utilized to determine the desired number of shots, desired fuel quantity for the shots, and the desired timing of the shots. An analogous map may be established for the minimum values of the shots. Therefore, the minimum fuel amounts for the shots may vary based on speed and load. In addition, the minimum amounts may vary based on acceleration.

After the minimum and desired amounts of fuel are established for the desired number of shots, the actual amount of fuel to be injected into during each shot is established by the group of steps generally designated 106 and shown in FIGS. 5 and 6. The program illustrated in groups 100, 102, 104, 106 is preferably stored on a computer readable medium such as the memory provided by the ECM/controller 56. Further, the controller is operable to generate control and injection signals $S_{10}$ for transmission through a computer readable data transmission medium, which can be placed in communication with a diagnostic design display and input apparatus (not shown) including a display and keypad. Generally, the program will determine the desired fuel quantity based on speed and load, and then the fuel will be partitioned into a desired number of shots. The fuel amount in each shot is compared with minimum values, and modifications are made accordingly. An injection signal is then generated.

Figure 3:
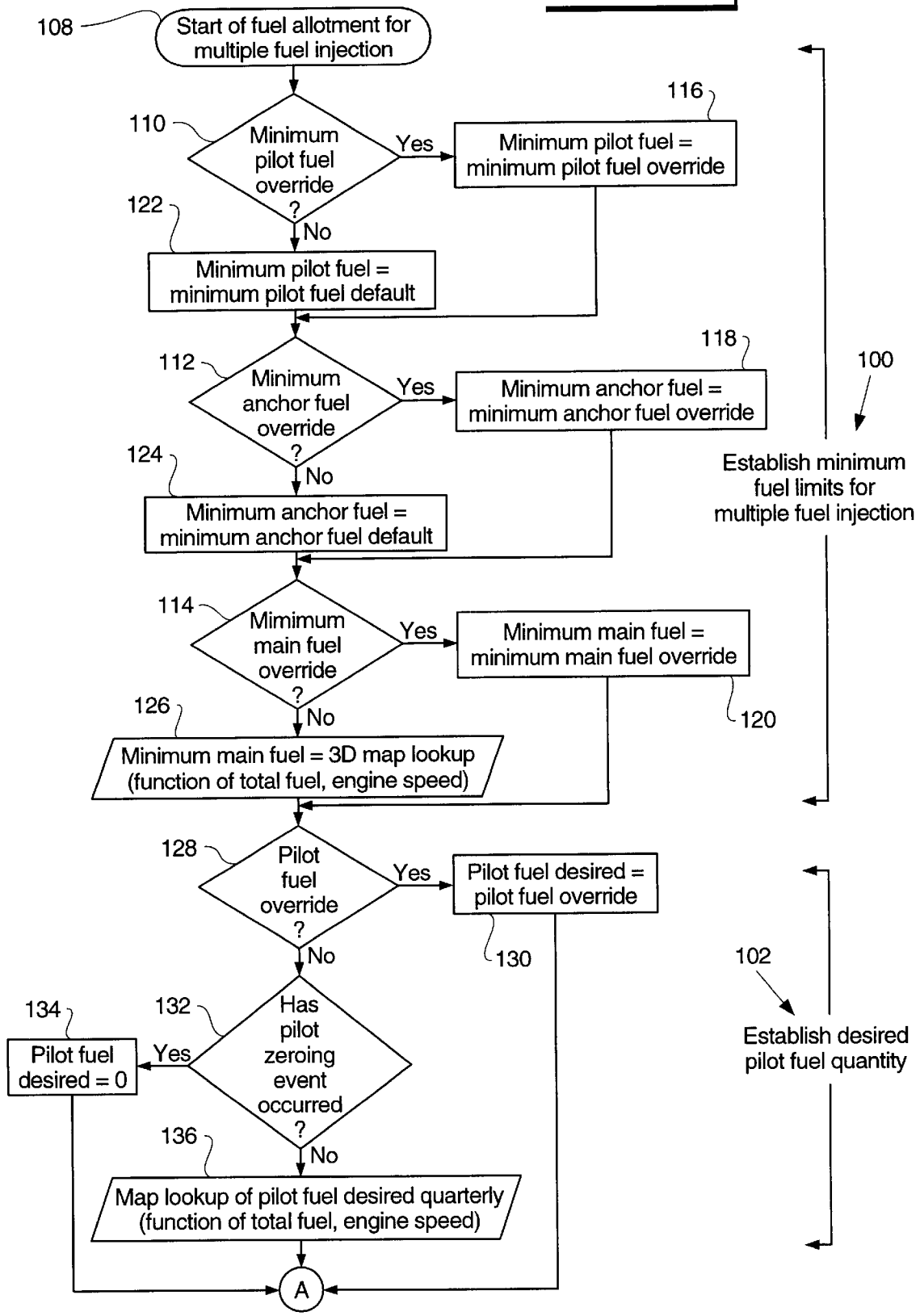
FIG. 3 is a schematic block diagram illustrating determination of minimum pilot, main, anchor shot fuel amounts, and desired pilot shot fuel amounts.

Referring independently to FIG. 3, allocation of the total available fuel quantity, determined by the governor, is begun at 108 and leads into the determination steps 100 of the minimum fuel shot amounts. In one embodiment, during design or testing, for each of the minimum pilot shot fuel amount, minimum main shot fuel amount, and minimum anchor shot fuel amount, the program checks for an override at steps 110, 112, and 114, respectively. The overrides are used as design tools by cell developers to isolate conditions and limit variables in engines. The overrides are not intended for use in normal operation of the engine. If an override is desired for the pilot fuel shot, the minimum pilot shot fuel amount is set to the minimum pilot shot fuel override amount at step 116. Similarly, if an override is desired for the anchor fuel shot, the minimum anchor shot fuel amount is set to the minimum anchor shot fuel override amount at 118, and if an override is desired for the main fuel shot, the minimum main shot fuel amount is set to the minimum main shot fuel override amount at 120. As mentioned, in the preferred embodiment, during normal operations of the engine, the overrides are not used, and therefore the above checks are not made, i.e., the steps are skipped. In one embodiment, if there are no overrides desired, or the engine is operating under normal operations, in which case the overrides are not utilized, the minimum pilot shot fuel amount is determined by setting it to a default minimum pilot shot fuel amount at 122, and the minimum anchor shot fuel amount is determined by setting it to a default minimum anchor shot fuel amount at 124. The minimum main shot fuel amount is determined at step 126 by looking up the amount on a multi-dimensional lookup table or map based on desired total fuel quantity to be injected, engine speed, and load as factors for looking up and setting the minimum main shot fuel amount. Alternatively, similar look up tables, based on engine speed and load, could be used to establish the minimum pilot and anchor shot fuel amounts.

Determining the desired pilot shot fuel amount 102 begins with a check for an override at 128. If an override is desired for design purposes, the desired pilot shot fuel amount is set to the desired pilot shot fuel override amount at 130. If no override is called for, the program determines if a pilot zeroing event has occurred at 132. A pilot zeroing event is an event that suggests the quantity of fuel placed in the pilot injection should be reduced to zero. Pilot zeroing events include, for example, operation of the ECM by a low battery such that there is insufficient energy for the desired number of injection shots, moments of high acceleration, and a pilot shot is not desired by the given injection strategy, e.g., during low speed and low load conditions illustrated in FIG. 7. In one embodiment, a bitmask is read, and if the bitmask is zero (0), only a main shot is desired. If the bitmask is one (1), pilot and main shots are desired. If the bitmask is two (2), main and anchor shots are desired, and if the bitmask is three (3), all three shots are desired. Thus, if the bitmask is zero or two, the desired pilot shot fuel amount is set to substantially zero at 134. If the bitmask is a one or three, the desired pilot shot fuel amount is determined at 136 by looking up the amount in a lookup table or map as a function of total fuel requested, and engine speed and engine load. The desired pilot shot fuel amount is then set to the amount taken from the lookup table or map. The use of a bitmask is implementation dependent. That is, any memory scheme may be utilized that is able to track the number of shots desired. For example, the number and type of shots desired, may be determined using an injection strategy such as illustrated in FIG. 7. The number and type of shots desired may be stored in a lookup table, index table, or other memory scheme such as a bitmask.

Figure 4:
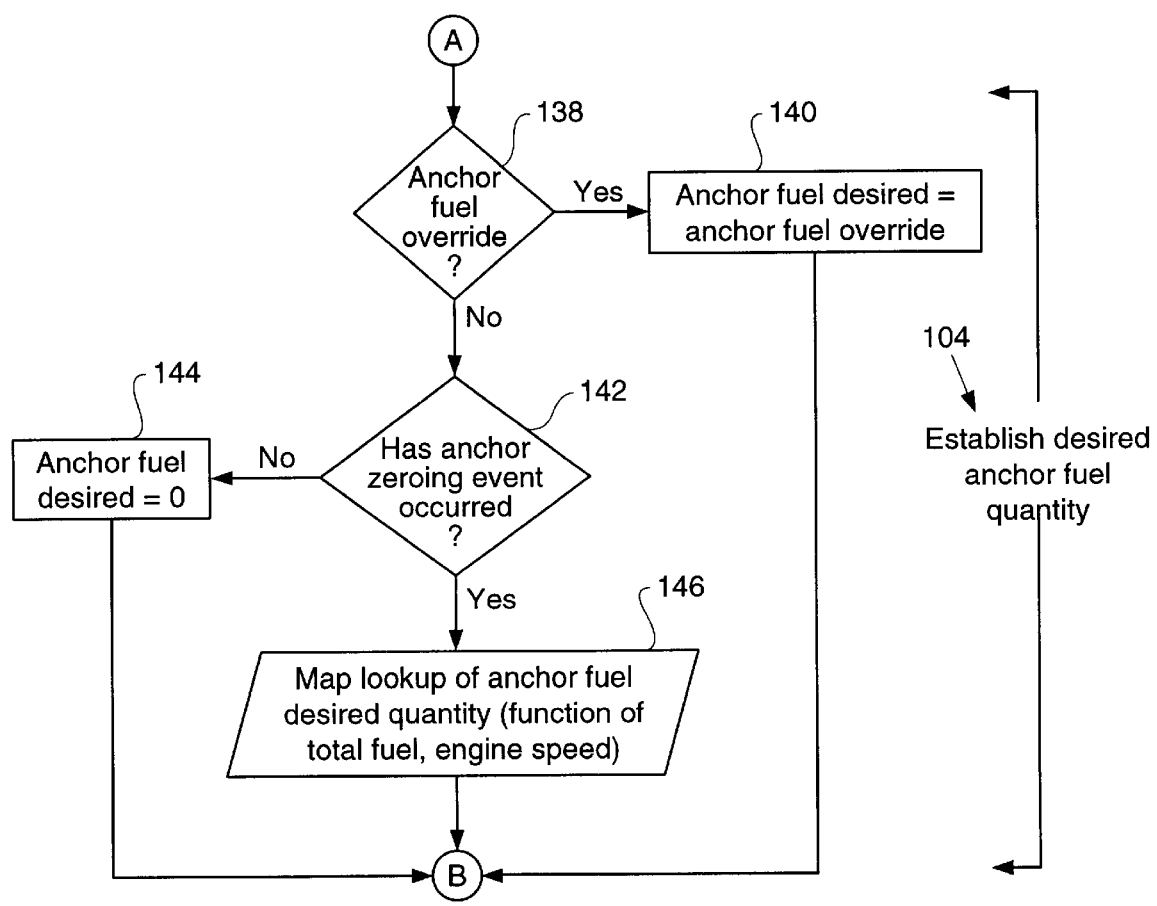
FIG. 4 is a schematic block diagram illustrating determination of a desired anchor shot fuel amount.

Referring to FIG. 4, determining, at 104, the desired anchor shot fuel amount, is similar to the pilot determination and begins with a check for an override at 138. If an override is desired for design purposes, the desired anchor shot fuel amount is set to the desired anchor shot fuel override amount at 140. If no override is called for, the program determines if an anchor zeroing event has occurred at 142. Such events include, for example, operation of the ECM by a low battery such that there is insufficient energy for the desired number of injection shots and moments of high acceleration, and the it is determined using an injection strategy, that an anchor shot is not desired under the current operating conditions. Again, the bitmask is read, and if the bitmask is zero (0), only a main shot is desired. If the bitmask is one (1), pilot and main shots are desired. If the bitmask is two (2), main and anchor shots are desired, and if the bitmask is three (3), all three shots are desired. If the bitmask is four (4), no shot is desired to implement a cut out strategy. Thus, if the bitmask is zero or one, the desired anchor shot fuel amount is set to substantially zero at 144. If the bitmask is a two or three, the desired anchor shot fuel amount is determined at 146 by looking up the amount in a lookup table or map as a function of total fuel and engine speed. The desired anchor shot fuel amount is then set to the amount taken from the lookup table or map.

Referring to FIG. 5, after the minimum and desired pilot, minimum main, and minimum and desired anchor shot fuel amounts are determined, the program determines at 106 the actual pilot, main, and anchor shot amounts to be injected. The first step 148 in this determination is to compare the total available fuel quantity to be injected as determined by the governor system with the minimum main shot fuel amount, and if the total available fuel is less than or equal to the minimum main shot fuel amount, the actual pilot and anchor shot fuel amounts are set to substantially zero and the actual main shot fuel amount is set to the total available fuel in step 150. The program then is transferred to the return location 108 (FIG. 3). If the total available fuel for the injection event is greater than the minimum main shot fuel amount, the controller then compares the total available fuel to be injected with a minimum main and minimum pilot sum at step 152. Additionally at step 152, the controller compares the desired pilot shot fuel amount with the minimum pilot shot fuel amount. If the total available fuel is less than the minimum main and minimum pilot sum or if the desired pilot shot fuel amount is less than the minimum pilot shot fuel amount, then the actual pilot shot fuel amount is set to zero at step 154, and the controller proceeds to determine if there is enough total available fuel for the main and anchor fuel shots, if desired, as set forth in the group of steps 156. This assures that the main shot has priority over both the pilot and anchor shots, so that the main shot gets the minimum main shot fuel amount, if available, or at least the total fuel set by the governor system if the total fuel requested by the governor is less than the minimum main.

If there is not enough fuel for the pilot, the actual pilot fuel shot amount will be set to zero, and the controller compares the total available fuel to a minimum main and minimum anchor sum, to determine how much fuel may be available for the anchor shot, and compares the desired anchor shot fuel amount with the minimum anchor shot fuel amount. If the total fuel is less than the minimum main and minimum anchor sum or the desired anchor shot fuel amount is less than the minimum anchor shot fuel amount, the actual anchor shot fuel amount is set to zero at 160, and the actual main fuel amount is set to the total fuel or governor fuel output. If, however, the minimum main and minimum anchor sum is less than or equal to the total desired fuel and the desired anchor shot fuel amount is greater than or equal to the minimum anchor shot amount at step 158, then the controller compares the total desired fuel with a minimum main and desired anchor sum at 162. If the total fuel is less than the minimum main and desired anchor sum, the actual main shot fuel amount is set to the minimum main shot amount, and the actual anchor shot fuel amount is set equal to a difference of the total fuel less the minimum main shot fuel amount at step 164. The program then returns to the start location 108.

If, however, the total fuel is greater than or equal to the minimum main and desired anchor sum, the actual anchor shot fuel amount is set to the desired anchor shot fuel amount, and the actual main shot fuel amount is set to a difference of the total available fuel less the actual anchor shot fuel amount which has been set to the desired anchor shot fuel amount at step 166. Thereafter, control is returned to the start location 108 of FIG. 3. Thus, the program operates to give the main fuel shot priority over both the pilot and anchor shots. Further, the program operates to give the pilot shot priority over the anchor shot while recognizing the possibility that while there may not be enough fuel for both the main and the pilot shots, there may be sufficient fuel for both the main and the anchor shots. Thus, after determining there is not enough for the pilot shot, the controller proceeds to determine if there is enough for the anchor shot. Additionally, the program checks to see if there is enough fuel for both the minimum main shot and the desired anchor shot amounts, and if there is enough, the anchor shot gets its desired amount and the main shot gets its minimum and any extra. If there is not enough for both the minimum main and desired anchor shot amounts, the main shot gets its minimum and the anchor gets its minimum plus any extra, so that the actual anchor amount is as close as possible to the desired anchor amount.

If in step 152 it is determined that the total fuel is greater than or equal to the minimum main and minimum pilot sum and the desired pilot shot fuel amount is greater than the minimum pilot shot fuel amount, the controller, at step 168, compares the total fuel with a minimum pilot, minimum main, and minimum anchor sum and compares the desired anchor shot fuel amount with the minimum anchor shot fuel amount.

If at step 168 the total fuel is less than the minimum pilot, minimum main, and minimum anchor sum or the desired anchor shot fuel amount is less than the minimum anchor shot fuel amount, the actual anchor shot fuel amount is set to zero at step 170, and at step 172, the controller compares the total fuel with a minimum main and desired pilot sum. If the total fuel is less than the minimum main and desired pilot sum, the actual main shot fuel amount is set to the minimum main shot fuel amount, and the actual pilot shot fuel amount is set to a difference of the total fuel less the minimum main shot fuel amount at step 174. Alternatively, if the total fuel is greater than or equal to the minimum main and desired pilot sum, the actual pilot shot fuel amount is set to the desired pilot shot fuel amount, and the actual main shot fuel amount is set to a difference of the total fuel less the actual pilot shot fuel amount which has been set to the desired pilot shot fuel amount at step 176. After the actual pilot shot and actual main shot fuel amounts are set, the program returns to the start location 108. Thus, the controller is operable to determine if there is enough fuel for the minimum main shot, minimum pilot shot, and minimum anchor shot, and if there is not enough fuel for all three shots, the actual anchor fuel shot is set to substantially zero. Thereafter, the controller determines if there is enough fuel for both the minimum main fuel shot and the desired pilot fuel shot. If there is enough for both the minimum main shot and the desired pilot, the pilot shot receives the desired amount, and the main receives its minimum. Any excess above the minimum main and desired pilot sum is allotted to the main shot because it is insufficient for the minimum anchor shot. If, however, there is not enough fuel for both the minimum main and desired pilot shots, the main gets its minimum fuel amount, and the pilot gets its minimum plus any excess, so that the pilot shot is as close to the desired pilot shot fuel amount as possible.

If at step 168, the total fuel is greater than or equal to the minimum pilot, minimum main, and minimum anchor sum and the desired anchor shot fuel amount is greater than or equal to the minimum anchor shot fuel amount, the controller compares the total fuel with a minimum anchor, minimum main, and desired pilot sum at step 178 (FIG. 6). If the total fuel is less than the minimum anchor, minimum main, desired pilot sum, then, in step 180, the actual main shot fuel amount is set to the minimum main shot fuel amount, the actual anchor shot fuel amount is set to the minimum anchor shot fuel amount, and the actual pilot shot fuel amount is set equal to a difference of the total fuel less the actual main shot fuel amount less the actual anchor shot fuel amount. Thereafter, the program proceeds to the start location 108. Thus, the pilot fuel shot is again given priority over the anchor fuel shot by giving the pilot fuel shot any extra fuel, above the sum of the three minimums, which would bring it as close to the desired pilot fuel shot amount as possible.

If in step 178 the total fuel is greater than or equal to the minimum anchor, minimum main, and desired pilot sum, the actual pilot shot fuel amount is set to the desired pilot shot fuel amount at step 182. Then the controller, at step 184 compares the total fuel with a desired anchor, minimum main, and actual pilot/desired pilot sum. If the total fuel is less than the desired anchor, minimum main, desired pilot sum, the actual main shot fuel amount is set to the minimum main shot fuel amount, and the actual anchor shot fuel amount is set to a difference of the total fuel less the minimum main shot fuel amount and less the desired pilot shot fuel amount in step 186. Thus, after the desired pilot amount and minimum main amount are satisfied, excess fuel beyond the minimum anchor amount is given to the anchor so that it is as close to the desired anchor amount as possible.

If to the contrary, the total fuel is greater than or equal to the desired anchor, minimum main, desired pilot sum, the actual anchor shot fuel amount is set to the desired anchor shot fuel amount, and the actual main shot fuel amount is set to a difference of the total fuel less the desired anchor shot fuel amount and less the desired pilot shot fuel amount in step 188. Thus, the controller assures that the pilot shot receives the desired pilot shot fuel amount and then determines if there is enough fuel for the desired anchor shot fuel amount. If there is enough fuel for the desired anchor and pilot shot fuel amounts, the program gives the main shot any extra there is available. Thereafter, the program is returned to the start location 108 for the next injection cycle. This fuel partitioning strategy has the flexibility to allow the program to set a governing shot. The governing shot is the shot which will receive all remaining fuel after the other two are satisfied. For example, if the desired main and desired anchor are set to low amounts, they would be satisfied and the pilot would be the governing shot receiving all the excess fuel.

INDUSTRIAL APPLICABILITY

Utilization of an injection method and system in accordance with the present invention provides for better fuel management and emission control during varying engine operating conditions as explained above. Although the particular injection waveform for delivering multiple fuel injections may vary depending upon the particular engine operating conditions, the present system is capable of dynamically determining the timing associated with each individual fuel injection shot, the injection duration, injection quantity, any delays between fuel shots, and the displacement of the cylinder piston relative to the beginning of each fuel shot regardless of the type of electronically controlled fuel injectors being utilized, regardless of the type of engine being utilized, and regardless of the type of fuel being utilized. In this regard, appropriate fuel maps relating rail pressure, engine speed, engine load, pilot/main/anchor duration times, pilot/main/anchor fuel quantities, anchor timing delays, pilot/main timing and other parameters can be stored or otherwise programmed into ECM 56 for use during all operating conditions of the engine. These operational maps, tables and/or mathematical equations stored in the ECM programmable memory determine and control the various parameters, including fuel shot quantities, associated with the appropriate multiple injection events to achieve desired emissions control.

In one embodiment of the present invention, an injection strategy stored as a map or lookup table, such as that illustrated in FIG. 7, may be utilized to determine the desired number of fuel shots, quantity of fuel for the shots, and timing of the shots to be injected. However, the current load and speed parameters may not match identically with stored values on the map or table. Therefore the values on the map may need to be interpolated to determine the desired number of shots and associated fuel quantity for them, i.e., the desired injection event. As different regions are traversed on the map, the number of shots, quantity of fuel for the particular shots, and timing of the shots may vary. Therefore, in one embodiment, the present invention will determine the partitioning of the fuel among the shots by comparing the desired number of shots for the injection event and associated desired fuel quantities, which may be determined via interpolation of a map such as illustrated in FIG. 7, with established minimum fuel quantities and priorities for the particular shots, which may also be determined via interpolation of a map such as illustrated in FIG. 7. The present invention then modifies the injection signal accordingly and delivers the injection signal to the appropriate fuel injection device.

It is also recognized that the particular ambient conditions under which the engine will be operating will affect the amount of emissions produced by the engine. As the ambient conditions change, so may the engine exhaust emissions. As a result, the multiple fuel injection shots may have to be adjusted in order to keep the engine emissions within acceptable limits based upon ambient conditions. These adjustments may include adjustments to the pilot injection timing and quantity, the main injection timing and quantity, the delay between the pilot and main injections, and the delay between the main and anchor injections. Ambient conditions can be monitored by providing and coupling appropriate sensors to ECM 56 as will be hereinafter explained.

FIG. 8 is an exemplary schematic diagram showing representative sensor inputs to ECM 56 in order to monitor the ambient conditions under which the engine is operating. For example, appropriate sensors can be positioned and located with respect to a particular engine so as to input appropriate signals 80 and 82 to ECM 56 representative of the ambient temperature and/or pressure under which the engine is currently operating. Based upon the ambient temperature and/or pressure, ECM 56 can select the appropriate maps or lookup tables for that particular ambient condition and thereafter either determine the appropriate parameters for each injection event based upon the existing ambient temperature and/or pressure, or ECM 56 could determine a correction or adjustment factor to be applied to the injection event parameters calculated based upon some normal or standard operating conditions such as a standard day temperature and pressure. In this regard, the appropriate maps and lookup tables could include a set of such maps and/or lookup tables based upon certain predetermined ambient temperature and/or pressure ranges, a different set of maps and/or tables being applicable to each predetermined range. On the other hand, ECM 56 could likewise include a set of maps and/or lookup tables based upon ambient temperatures and/or pressures which will enable ECM 56 to determine a correction or adjustment factor which can be applied to the various parameters of each injection event, the correction or adjustment factor being scaled with reference to some normal or standard operating engine conditions.

As indicated in FIG. 8, based upon a sensor input of ambient temperature 80 and/or ambient pressure 82, ECM 56 would output appropriate signals $S_{10}$ to the fuel injection devices to adjust the desired pilot shot timing and/or fuel quantity (adjustment 92), to adjust the main fuel shot timing and/or fuel quantity (adjustment 94), to adjust the desired delay between the pilot and main fuel shots (adjustment 96), and/or to adjust the desired delay between the main and anchor fuel shots (adjustment 98). Any one or more of these adjustments 92, 94, 96 and 98 may be accomplished by the ECM to achieve the desired pilot, main and anchor fuel shots in order to control exhaust emissions and keep such emissions within certain predetermined limits.

It is also recognized and anticipated that other parameters or engine operating conditions can likewise be sensed and inputted to ECM 56, other than ambient temperature 80 and/or ambient pressure 82, in order to determine the ambient operating conditions of the engine. For example, ECM 56 could be coupled to a sensor to receive a signal 84 indicative of the inlet manifold temperature associated with the engine, to a sensor to receive a signal 86 indicative of the inlet manifold pressure, to a sensor to receive a signal 88 indicative of the humidity, and/or to a sensor to receive a signal 90 indicative of the crankcase oil pressure. These engine parameters could likewise be correlated or translated through various maps, tables and/or equations to establish the ambient operating conditions of the engine and, based upon any one or a plurality of such signals 80, 82, 84, 86, 88 and 90, ECM 56 could made any one or more of the adjustments 92, 94, 96 and/or 98 and output appropriate signals $S_{10}$ to adjust the parameters of the multiple injection events. All of the sensors providing signals 80, 82, 84, 86, 88 and/or 90 would preferably continuously monitor its corresponding parameter associated with the operation of the engine and each such sensor would output an appropriate signal to ECM 56 indicative of such sensed parameters. Still further, it is recognized and anticipated that still other parameters other than those identified in FIG. 8 could likewise be used to determine the ambient operating conditions of the engine.

Although fuel system 10 illustrated in FIG. 1 has been shown as a representative six injector system, it is recognized that the present invention could be incorporated into fuel injection systems including any number of fuel injectors as well as both hydraulically actuated and mechanically actuated electronically controlled fuel injector units, and common rail systems having digitally controlled fuel valves. Where mechanically actuated electronically controlled fuel injectors are used, the manifold 36 in FIG. 1 will typically be replaced with a mechanical actuating mechanism for causing each injector to pressurize fuel such as the mechanisms illustrated in U.S. Pat. Nos. 5,947,380 and 5,407,131. Other mechanisms for accomplishing this task are likewise known and available.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A fuel injection control system for partitioning a desired fuel quantity into separate fuel quantities comprising:
   at least one fuel injection device operable to deliver a plurality of fuel injection shots;
   an electronic controller coupled to the at least one fuel injection device;
   said controller being operable to determine a desired pilot shot fuel amount, a minimum main shot fuel amount, and a desired anchor shot fuel amount;
   said controller being operable to compare the total available fuel quantity with the desired pilot shot fuel amount, the minimum main shot fuel amount, and the desired anchor shot fuel amount; and
   said controller being operable to determine the actual pilot shot fuel amount to be commanded, the actual main shot fuel amount to be commanded, and the actual anchor shot fuel amount to be commanded for injection by the at least one fuel injection device.

2. The fuel injection control system according to claim 1 wherein the controller is operable to give the pilot shot priority over the anchor shot.

3. The fuel injection control system according to claim 1 wherein the controller is operable to give the main shot priority over the pilot shot.

4. The fuel injection control system according to claim 1 wherein the controller is further operable to determine if there is enough available fuel quantity for the minimum main shot fuel amount, determine if there is enough desired fuel quantity for the desired pilot shot fuel amount, determine if there is enough desired fuel quantity for the desired anchor shot fuel amount, and determine if there is enough desired fuel quantity for both the desired pilot and anchor shot fuel amounts.

5. The fuel injection control system according to claim 1 further comprising the controller being operable to determine a minimum pilot shot fuel amount and a minimum anchor shot fuel amount, and the controller is operable to compare the available fuel quantity with the minimum pilot shot fuel amount, the minimum main shot fuel amount, and the minimum anchor shot fuel amount.

6. The fuel injection control system according to claim 5 further comprising the controller being operable to compare the minimum pilot shot fuel amount with the desired pilot shot fuel amount, and if the desired pilot shot fuel amount is less than the minimum pilot shot fuel amount, set the actual pilot shot fuel amount to substantially zero; and the controller being operable to compare the minimum anchor shot fuel amount with the desired anchor shot fuel amount, and if the desired anchor shot fuel amount is less than the minimum anchor shot fuel amount, set the actual anchor shot fuel amount to substantially zero.

7. The fuel injection control system according to claim 5 wherein the operability of the controller to compare the desired fuel quantity with the desired and minimum pilot shot fuel amounts, the minimum main shot fuel amount, and the desired and minimum anchor shot fuel amounts further comprises the controller being operable to compare the desired fuel quantity with the minimum main shot fuel amount and if the desired fuel quantity is less than the minimum main shot fuel amount, set the actual main shot fuel amount to the desired fuel quantity and set the actual pilot shot and anchor shot fuel amounts to substantially zero, and if the desired fuel quantity is greater than the minimum main shot fuel amount, compare the desired fuel quantity with a minimum main and minimum pilot sum.

8. The fuel injection control system according to claim 7 wherein if the desired fuel quantity is less than the minimum main and minimum pilot sum, the controller is operable to set the actual pilot shot fuel amount to substantially zero and compare the desired fuel quantity with a minimum main and minimum anchor sum and if the desired fuel quantity is less than the minimum main and minimum anchor sum, set the actual anchor shot fuel amount to substantially zero and set the actual main shot fuel amount to the desired fuel quantity.

9. The fuel injection control system according to claim 8 wherein if the desired fuel quantity is greater than the minimum main and minimum anchor sum, the controller is operable to compare the desired fuel quantity with a minimum main and desired anchor sum and if the desired fuel quantity is less than the minimum main and desired anchor sum, set the actual main shot fuel amount to the minimum main shot fuel amount and set the actual anchor shot fuel amount to a difference between the desired fuel quantity and the minimum main shot fuel amount, and if the desired fuel quantity is greater than the minimum main and desired anchor sum, set the actual anchor shot fuel amount to the desired anchor shot fuel amount and set the actual main shot fuel amount to a difference between the desired fuel quantity and the desired anchor shot fuel amount.

10. The fuel injection control system according to claim 7 wherein if the desired fuel quantity is greater than the minimum main and minimum pilot sum, the controller is operable to compare the desired fuel quantity with the minimum main, minimum pilot, and minimum anchor sum and if the desired fuel quantity is less than the minimum main, minimum pilot, and minimum anchor sum, set the actual anchor fuel to substantially zero and compare the desired fuel quantity with a minimum main and desired pilot sum and if the desired fuel quantity is less than the minimum main and desired pilot sum set the actual main shot fuel amount to the minimum main fuel shot amount and set the actual pilot shot fuel amount to a difference of the desired fuel quantity less the minimum main fuel shot amount, and if the desired fuel quantity is greater than the minimum main and desired pilot sum, set the actual pilot shot fuel amount to the desired pilot shot fuel amount and set the actual main shot fuel amount to a difference of the desired fuel quantity less the desired pilot shot fuel amount.

11. The fuel injection system according to claim 10 wherein if the desired fuel quantity is greater than the minimum main, minimum pilot, and minimum anchor sum, the controller is operable to compare the desired fuel quantity with a minimum main, minimum anchor, and desired pilot sum and if the desired fuel quantity is less than the minimum main, minimum anchor, and desired pilot sum set the actual main shot fuel amount to the minimum main shot fuel amount, set the actual anchor shot fuel amount to the minimum anchor shot fuel amount, and set the actual pilot shot fuel amount to a difference of the desired fuel quantity less the minimum main fuel shot amount and less the minimum anchor shot fuel amount.

12. The fuel injection control system according to claim 11 wherein if the desired fuel quantity is greater than the minimum main, minimum anchor, and desired pilot sum, the controller is operable to set the actual pilot shot fuel amount to the desired pilot shot fuel amount and compare the desired fuel quantity with a minimum main, desired anchor, and desired pilot sum and if the desired fuel quantity is less than the minimum main, desired anchor, and desired pilot sum, set the actual main shot fuel amount to the minimum main shot fuel amount and set the actual anchor shot fuel amount to a difference of the desired fuel quantity less the minimum main shot fuel amount and less the desired pilot shot fuel amount.

13. The fuel injection control system according to claim 12 wherein if the desired fuel quantity is greater than the minimum main, desired anchor, and desired pilot sum, the controller is operable to set the actual anchor shot fuel amount to the desired anchor shot fuel amount and set the actual main shot fuel amount to a difference of the desired fuel quantity less the desired anchor shot fuel amount and less the desired pilot shot fuel amount.

14. The fuel injection control system according to claim 1 wherein the operability of the controller to determine the desired pilot shot fuel amount and the desired anchor shot fuel amount further comprises the controller being operable to:
  determine the occurrence of a pilot zeroing event and if a pilot zeroing event has occurred, set the desired pilot shot fuel amount to substantially zero, and if no pilot zeroing event has occurred, look up the desired pilot shot fuel amount from a pilot shot table;
  determine the occurrence of an anchor zeroing event and if an anchor zeroing event has occurred, set the desired anchor shot fuel amount to substantially zero, and if no anchor zeroing event has occurred, look up the desired anchor shot fuel amount from an anchor shot table.

15. A computer readable medium containing instructions for controlling a fuel injection control system to partition an available fuel quantity into separate fuel quantities comprising:
  determining a desired pilot shot fuel amount, a minimum main shot fuel amount, and a desired anchor shot fuel amount;
  determining if there is enough available fuel quantity for the minimum main shot fuel amount;
  determining if there is enough available fuel quantity for the desired pilot shot fuel amount;
  determining if there is enough available fuel quantity for the desired anchor shot fuel amount; and
  determining the actual pilot shot fuel amount, the actual main shot fuel amount, and the actual anchor shot fuel amount.

16. The computer readable medium according to claim 15 further comprising:
  determining a minimum pilot shot fuel amount and a minimum anchor shot fuel amount;
  determining if there is enough desired fuel quantity for the minimum pilot shot fuel amount prior to determining if there is enough desired fuel quantity for the desired pilot shot fuel amount;
  and determining if there is enough desired fuel quantity for the minimum anchor shot fuel amount prior to determining if there is enough desired fuel quantity for the desired anchor shot fuel amount.

17. The computer readable medium according to claim 15 wherein determining if there is enough desired fuel quantity for the desired pilot fuel shot amount is performed prior to determining if there is enough desired fuel quantity for the desired anchor shot fuel amount.

18. A method for controlling a fuel injection control system to partition a available fuel quantity into separate fuel quantities comprising:
  determining a desired pilot shot fuel amount, a minimum main shot fuel amount, and a desired anchor shot fuel amount;
  determining if there is enough available fuel quantity for the minimum main shot fuel amount;
  determining if there is enough available fuel quantity for the desired pilot shot fuel amount;
  determining if there is enough available fuel quantity for the desired anchor shot fuel amount;
  determining the actual pilot shot fuel amount, the actual main shot fuel amount, and the actual anchor shot fuel amount; and
  injecting at least the actual main shot fuel amount.

19. The method according to claim 18 further comprising injecting the actual pilot shot fuel amount prior to injecting the actual main shot fuel amount and injecting the actual anchor shot fuel amount after injecting the actual main shot fuel amount.

20. The method according to claim 18 wherein determining the actual pilot shot fuel amount comprises comparing the available fuel quantity with a desired pilot, minimum main, and desired anchor sum, and if the available fuel quantity is greater than or equal to the desired pilot, minimum main, and desired anchor sum, setting the actual pilot shot fuel amount equal to the desire pilot shot fuel amount.

* * * * *